US008429206B2

(12) United States Patent
Beigi et al.

(10) Patent No.: US 8,429,206 B2
(45) Date of Patent: Apr. 23, 2013

(54) METHOD AND APPARATUS FOR RULE-BASED TRANSFORMATION OF POLICIES

(75) Inventors: Mandis S. Beigi, White Plains, NY (US); Seraphin B. Calo, Cortlandt Manor, NY (US); David A. George, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 1600 days.

(21) Appl. No.: 11/623,407

(22) Filed: Jan. 16, 2007

(65) Prior Publication Data

US 2008/0172350 A1    Jul. 17, 2008

(51) Int. Cl.
*G06F 17/30* (2006.01)
(52) U.S. Cl.
USPC ............................................. 707/810; 726/11
(58) Field of Classification Search .................. 707/694, 707/810; 726/11
See application file for complete search history.

(56) References Cited

U.S. PATENT DOCUMENTS

| 6,439,783 B1* | 8/2002 | Antoshenkov ........................ 1/1 |
| 6,990,519 B2* | 1/2006 | Fortenberry et al. .......... 709/223 |
| 7,165,216 B2* | 1/2007 | Chidlovskii et al. .......... 715/237 |
| 7,584,499 B2* | 9/2009 | Lee et al. ........................... 726/1 |
| 2006/0195420 A1* | 8/2006 | Kilroy ................................ 707/3 |
| 2006/0282443 A1* | 12/2006 | Hanagata ...................... 707/100 |

FOREIGN PATENT DOCUMENTS

EP            345063 A2 * 12/1989

OTHER PUBLICATIONS

J.W. M. Stroet et al.; "Manipulation of Expressions in a Relational Algebra"; 1979; Inform Systems vol. 4, pp. 195-203.*
Dakshi Agrawal et al.; "Policy Management for Networked Systems and Applications"; IEEE, 2005; pp. 455-468.*
Beigi et al., "Policy Transformation Techniques in Policy-Based Systems Management," Proceedings of the Fifth IEEE International Workshop on Policies for Distributed Systems and Networks (Policy'04) (2004), pp. 1-10.
Verma, D., "The Generic Provisioning Problem," Informit.com (Nov. 14, 2000), pp. 1-16.

* cited by examiner

*Primary Examiner* — Monica Pyo
(74) *Attorney, Agent, or Firm* — Preston Young; Ryan, Mason & Lewis, LLP

(57) ABSTRACT

A logical expression of a policy is generated from another logical expression of a policy, for example, via a set of transformations, each of which comprises an input sub-expression and an output sub-expression. Any sub-expression of the input expression which matches an input sub-expression of a transformation rule is replaced with the output sub-expression of that transformation rule to form a sub-expression of the output expression.

20 Claims, 3 Drawing Sheets

METHOD AND APPARATUS FOR RULE-BASED TRANSFORMATION OF POLICIES

FIELD OF THE INVENTION

The present invention relates generally to policy-based systems management and, more particularly, to the transformation of high-level policies to low-level polices and vice versa.

BACKGROUND OF THE INVENTION

Policy based systems management provides a means for administrators, end-user's and application developers to manage and dynamically change the behavior of computing systems. One advantage of policy-based management is that it simplifies and automates the administration of IT environments. A significant part of the simplification is obtained by allowing the system administrator to specify policies at a high-level which are easily understandable rather than having to specify low-level and detailed policies fox each of the different devices in the system. Therefore, high-level enterprise-oriented policies will need to be transformed into lower-level technology-oriented policies in order for them to be adapted to the various components of the system. It is also very convenient to be able to transform low-level policies as used by the policy-enabled systems to the original high-level policies as specified originally by the system administrator. A policy often takes the form of a condition and an action such that when the condition evaluates to "true," the action is to be performed.

As an example, the transformation module would receive a policy of the form: If the user is from Corporate, then provide Gold level service. This policy would be transformed into the following more specific policy: If the user is from the subnet 9.10.3.0/24, then reserve a bandwidth of 20 Mbps and provide an encryption of 128 bits. In this case, the transformation rule specifies that a Corporate user is on the 9.10.3.0/24 subnet. It also specifies that a Gold service be defined to provide a bandwidth of 20 Mbps and an encryption of 128 bits.

Transformation using static rules can be very useful in simplifying the policy language as seen by the system administrator. First, a set of static transformation rules for converting policies in terms of high-level goals into policies in terms of low-level configuration parameters understandable by the system is defined by an expert user, who knows the details of the system and the definitions of the various objectives, such as what it means to provide gold level service in terms of performance, security, etc. These rules follow a policy language that is more detailed and complicated than the one used by the goal policies as seen by the system administrator. The policy transformation module transforms the objectives to low-level configuration parameters using the definitions specified by the transformation rules.

SUMMARY OF THE INVENTION

An embodiment of this invention is a method for generating a logical expression of a policy from another logical expression of a policy. In one embodiment, this method will entail the use of a set of transformations, each of which comprises an input sub-expression and an output sub-expression. Any sub-expression of the input expression which matches an input sub-expression of a transformation rule is replaced with the output sub-expression of that transformation rule to form a sub-expression of the output expression.

Techniques of the invention can be implemented, for example, via a computer-readable medium storing program code that executes inventive method steps, and in an apparatus including a memory and at least one processor coupled to the memory and operative to implement inventive method steps.

These and other objects, features and advantages of the present invention will become apparent from the following detailed description of illustrative embodiments thereof, which is to be read in connection with the accompanying drawings. For example, the policy expression tree matching described above may also be used in policy authoring as an offline policy checker to determine whether there are duplicate policies entered in the system and not merely for transformation of trees.

DETAILED DESCRIPTION OF PREFERRED EMBODIMENTS

The present invention will be described herein in the context of exemplary methods and apparatus for rule-based transformation of policies. It is to be understood, however, that the techniques of the present invention are not limited to the methods and apparatus shown and described herein.

Figure 1:
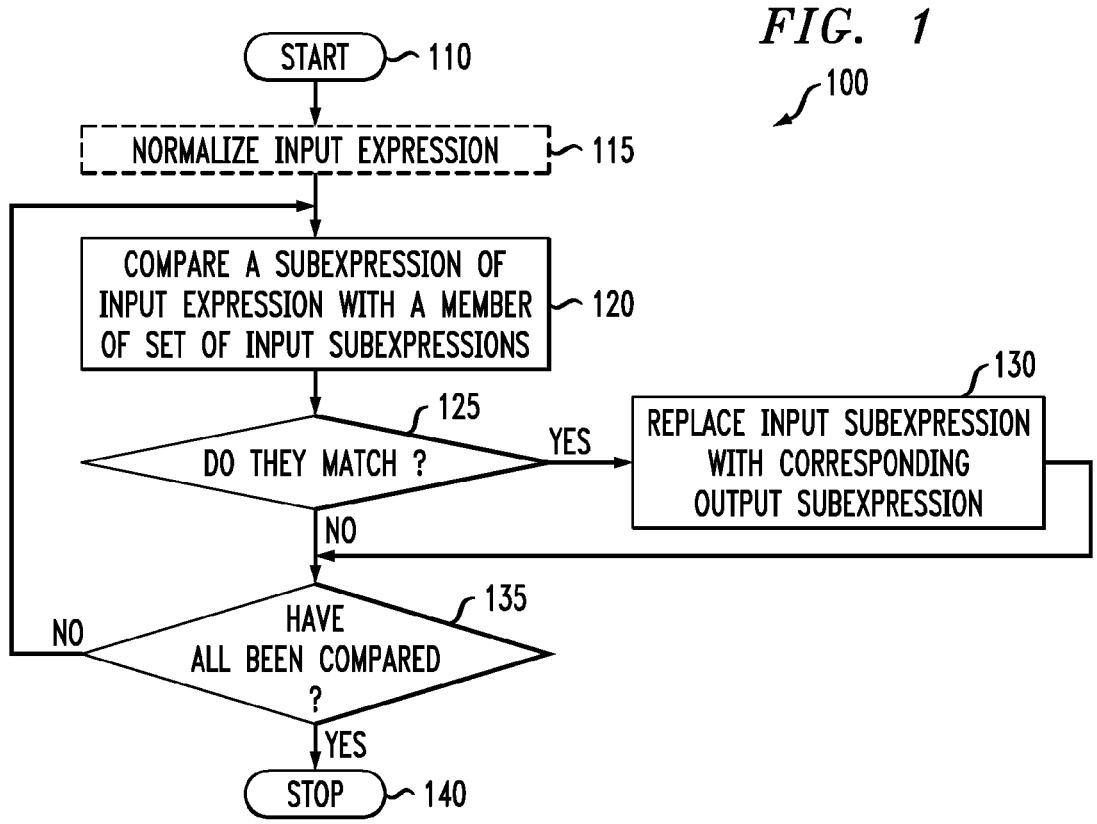
FIG. 1 is a simplified flow diagram illustrating an exemplary method in accordance with an aspect of the invention.

FIG. 1 is a simplified flow diagram illustrating an exemplary method 100 in accordance with an aspect of the invention. This method begins in Step 110 with an input expression, to be discussed further below with regard to FIG. 2.

Step 115 is an optional first step in which the input expression is normalized. This step may comprise converting the input expression to a canonical form, such as disjunctive-normal form or conjunctive-normal form. This step may also comprise sorting the operands of each operator using a sorting algorithm. Ideally, the set of input sub-expressions contained within the transformation rules will also be converted into the same canonical form and sorted in the same order, so as to ensure that each sub-expression in the logical sub-expression is in the same form as those specified by the transformation rules. Thus, one can traverse at least one parent node of at least one input sub-expression, comparing children nodes of the at least one parent node, and swap the children nodes of the at least one parent node to ensure they are in order. As used herein, including the claims, the children nodes are said to be "in order" when sorted using any sorting algorithm, to address the commutative law and/or to avoid cataloging permutations of patterns. For example, ordering of expression contents in alphabetic order on any level and the representation of logical operations on the vertical hierarchy provides a minimal canonical form.

In Step 120, one or more sub-expressions in the input expression are compared with one or more elements of the set of input expressions. This may be done, for example, by forming a string that represents the contents of each sub-expression and then comparing the strings representing the sub-expressions in the input expression with the strings representing the elements of the set of input expressions. For example, this string could be formed by performing a traversal (including, but not limited to, pre-order; in-order, and/or post-order traversal) of each sub-expression and concatenating the contents of each node visited. As used herein, including the claims, a traversal is intended to encompass, for example, a tree traversal, which may be defined as the process of visiting each node in a tree data structure. Tree traversal provides for sequential processing of each node in what may be, by nature, a non-sequential data structure. Such traversals are classified by the order in which the nodes are visited (for example, the aforementioned pre-order, in-order, and/or post-order traversal).

If a match is found (Step 125), the method continues in Step 130, where the sub-expression of the input expression (both to be discussed further below with regard to FIG. 2) which matches an input sub-expression of a transformation rule is replaced with the corresponding output sub-expression (all of which are to be discussed further below with regard to FIG. 3) to form a sub-expression of the output expression (both to be discussed further below with regard to FIG. 4). Note that, as used herein, including the claims, a "match" in a context such as step 125 is intended to denote identity or substantial similarity, such as where the strings compared as described in the preceding paragraph are the same. This process continues until all sub-expressions of the input expression have been compared with all inputs of all transformation rules (Steps 135 and 140).

In a preferred embodiment, the input expression and output expression are syntactically distinct but semantically equivalent. For example, the input expression may represent a high-level policy and the output expression may represent a low-level policy; conversely, the input expression may represent a low-level policy and the output expression may represent a high-level policy.

Thus, FIG. 1 is an example of how at least one output expression can be generated from at least one input expression, where the at least one input expression is a logical expression of a first policy and the at least one output expression is at least one logical expression of a second policy, the method comprising the step of applying at least one transformation 130 to at least one sub-expression of the at least one input expression to produce the at least one output expression. The notation "first policy" and "second policy" is employed for clarity, to account, for example, for the aforementioned case where the input expression and output expression are syntactically distinct but semantically equivalent.

Figure 2:
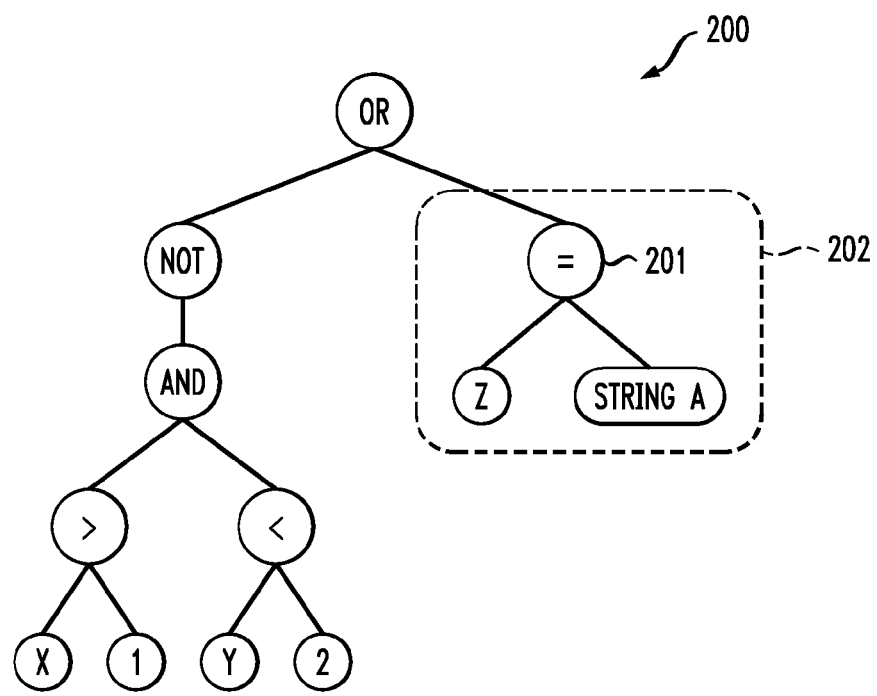
FIG. 2 shows an exemplary input expression in accordance with an aspect of the invention.

FIG. 2 is an exemplary input expression in accordance with an aspect of the invention. Specifically, FIG. 2 shows a tree representation 200 of the condition "(!((X>1)&&(Y<2)))||(Z=stringA)" where "!" represents the NOT (negation or complement) operator; "||" represents the OR (disjunction) operator, and "&&" represents the "AND" (conjunction) operator. Within this tree, it should be noted that each node 201 can serve as the root of a subtree 202 which itself constitutes a sub-expression of the logical expression. Operators in parent nodes act on operands stored in the child nodes, the operands comprising either one or more logical sub-expressions or one or more variables and/or constants. Although the description herein is presented in terms of a logical expression in tree form, no particular form is required by the present invention. That is, as used herein, including the claims, unless otherwise indicated, the term "representation" is intended to include, but not be limited to, a tree representation.

Figure 3:
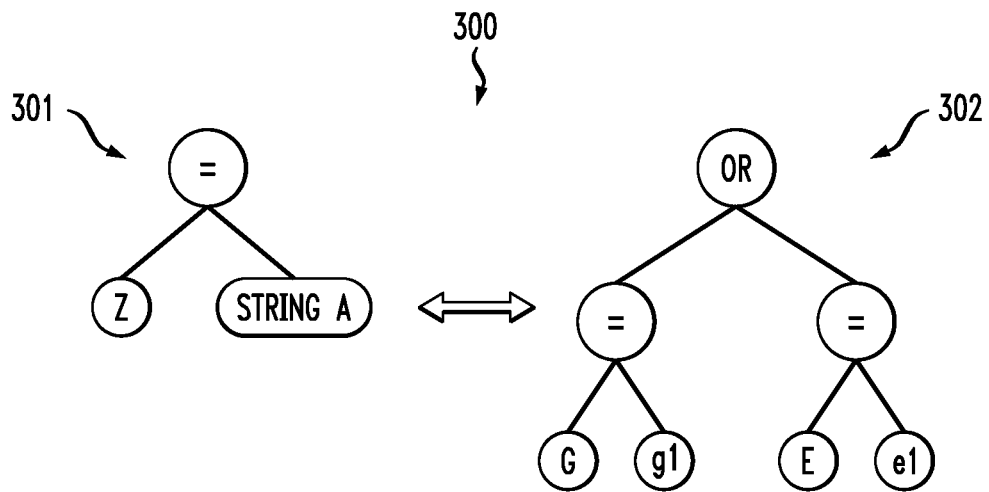
FIG. 3 shows an exemplary transformation rule in accordance with an aspect of the invention.

FIG. 3 shows an exemplary transformation rule in accordance with an aspect of the invention. This transformation rule 300 comprises an input sub-expression 301 and a corresponding output sub-expression 302. Specifically, the input sub-expression 301 is a tree representation of the condition "(Z=stringA)" and the output sub-expression 302 is a tree representation of the condition "(G=g1)||(E=e1)" where "!" represents the NOT (negation or complement) operator, "||" represents the OR (disjunction) operator, and "&&" represents the "AND" (conjunction) operator. It is preferable though not mandatory that the input sub-expression 301 and output sub-expression 302 of a given transformation rule 300 are syntactically distinct but semantically equivalent. Harking back to FIG. 1, in step 130, any sub-expression (202 in FIG. 2) of an input expression (200 in FIG. 2) which matches an input sub-expression 301 of a transformation rule 300 is transformed in conjunction with the corresponding output sub-expression 302. Although in a preferred embodiment this transformation comprises substitution, other operations may be used instead, for example, concatenation.

The transformation rules may be implemented through a number of means. For example, there could be a set of input sub-expressions and a corresponding set of output sub-expressions. In this implementation, the transformation step may comprise comparing a sub-expression of the input expression to each element of a set of input sub-expressions and then, if a match is found between a sub-expression of the input expression and a element of the set of input sub-expressions, replacing the sub-expression of the input expression that matches the element of the set of input sub-expressions with a output sub-expression that corresponds to that element of the set of input sub-expressions. As used herein, including the claims, an output sub-expression "corresponds" to an input sub-expression when the output sub-expression is produced from the input sub-expression by applying the transformation rules, for example, by looking for a match as set forth above and then finding the output sub-expression from, for example, an associative array as set forth immediately below.

A preferred embodiment is one in which the input sub-expression and output-expression of each transformation rule are a key and corresponding value (i.e. an entry) within an associative array. An "associative array," as used herein (including the claims) is intended to encompass a dense/fall array of data values wherein a plurality of keys are associated with a corresponding plurality of values one for one as entered in the array. These implementations are for purposes of illustration only and should be construed to limit the scope of the invention disclosed herein.

Figure 4:
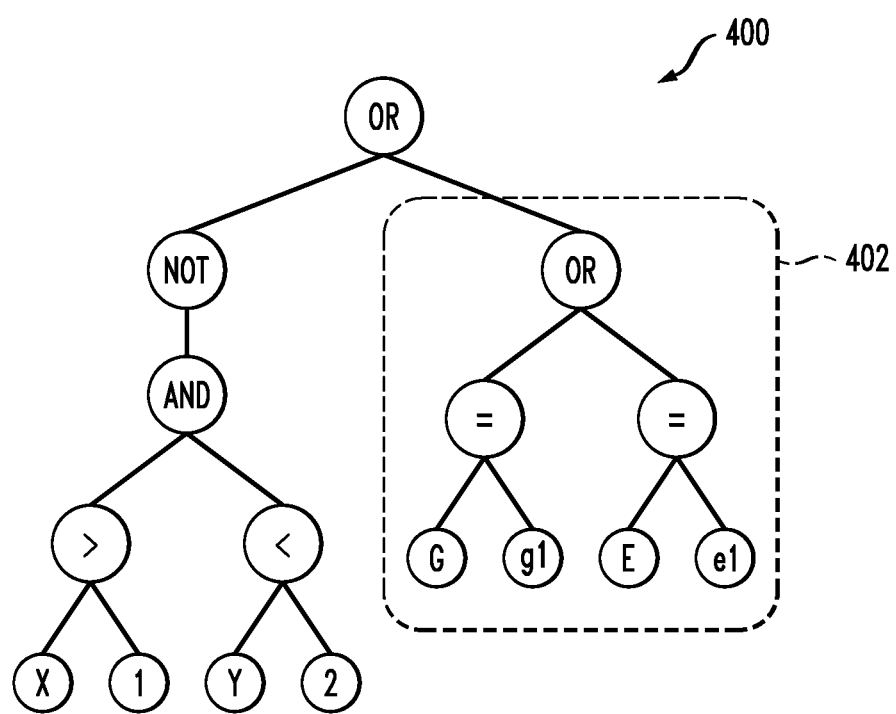
FIG. 4 shows an exemplary output expression in accordance with an aspect of the invention.

FIG. 4 shows an exemplary output expression in accordance with an aspect of the invention. Specifically, the output expression 400 is a tree representation of the condition "(!((X>1)&&(Y<2))||((G=g1)||(E=e1))" where "!" represents the NOT (negation or complement) operator, "||" represents the OR (disjunction) operator, and "&&" represents the "AND" (conjunction) operator. Output expression 400 represents the result of the application of transformation rule 300 in FIG. 3 to the input expression 200 in FIG. 2. Specifically, the sub-expression (202 in FIG. 2) of the input expression (200 in FIG. 2) which matches an input sub-expression (301 in FIG. 3) of a transformation rule (300 in FIG. 3) is replaced with the corresponding output sub-expression (302 in FIG. 3) to form a sub-expression (402 in FIG. 4) of the output expression (400 in FIG. 4).

A variety of techniques, utilizing dedicated hardware, general purpose processors, firmware, software, or a combination of the foregoing may be employed to implement the present invention. One or more embodiments of the invention can be implemented in the form of a computer product including a computer usable medium with computer usable program code for performing the method steps indicated. Furthermore, one or more embodiments of the invention can be implemented in the form of an apparatus including a memory and at least one processor that is coupled to the memory and operative to perform exemplary method steps.

Figure 5:
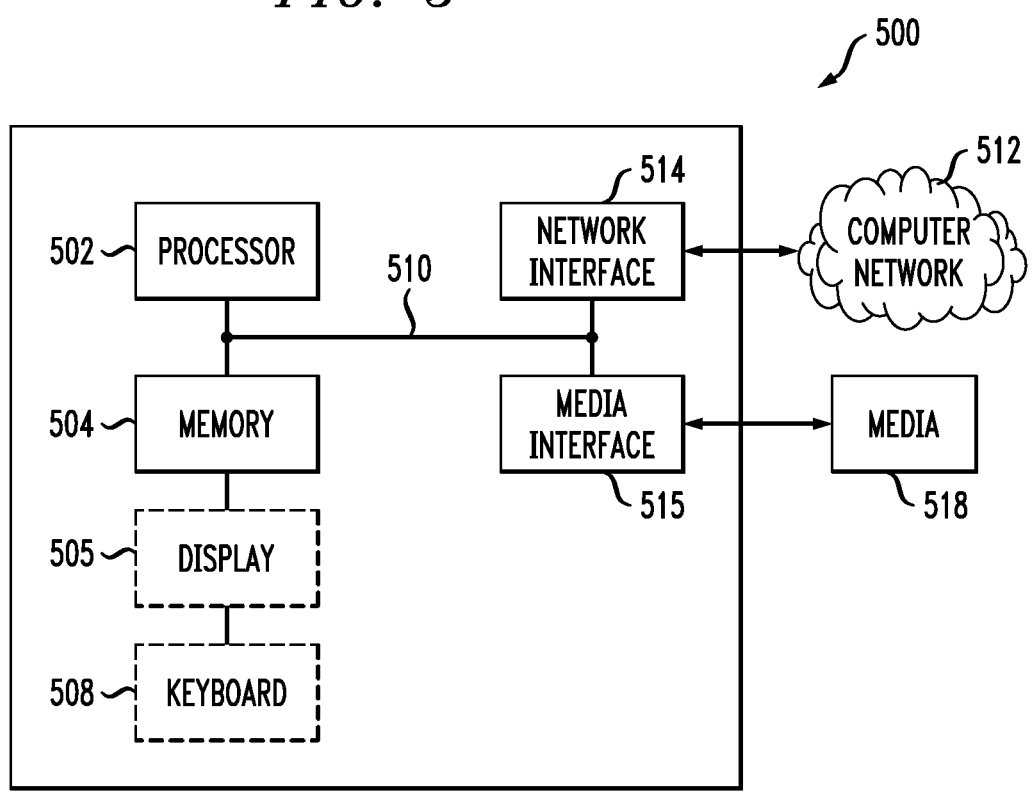
FIG. 5 depicts an exemplary computer system which can be used to implement one or more inventive techniques.

At present, it is believed that one or more embodiments will make substantial use of software running on a general purpose computer or workstation. With reference to FIG. 5, such an implementation might employ, for example, a processor 502, a memory 504, and an input/output interface formed, for example, by a display 505 and a keyboard 508. The term "processor" as used herein is intended to include any processing device, such as, fox example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (lead only memory), a fixed memory device (e.g., hard drive), a removable memory device (e.g., diskette), a flash memory and the like. In addition, the phrase "input/output interface" as used herein, is intended to include, for example, one or more mechanisms for inputting data to the processing unit (e.g., mouse), and one or more mechanisms for providing results associated with the processing unit (e.g., printer). The processor 502, memory 504, and input/output interface such as display 505 and keyboard 508 can be interconnected, for example, via bus 510 as part of a data processing unit 500. Suitable interconnections, for example via bus 510, can also be provided to a network interface 514, such as a network card, which can be provided to interface with a computer network 512, and to a media interface 515, such as a diskette or CD-ROM drive, which can be provided to interface with media 518.

Accordingly, computer software including instructions or code fox performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. Such software could include, but is not limited to, firmware, resident software, microcode, and the like.

Furthermore, the invention can take the form of a computer program product accessible from a computer-usable or computer-readable medium (e.g., media 518) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (e.g. memory 504), magnetic tape, a removable computer diskette (e.g. media 518), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 502 coupled directly or indirectly to memory elements 504 through a system bus 510. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard(s) 508, display(s) 505, pointing devices, and the like) can be coupled to the system either directly (such as via bus 510) or through intervening I/O controller's (omitted for clarity).

Network adapters such as network interface 514 may also be coupled to the system to enable the data processing system to become coupled to other data processing systems or remote printers or storage devices through intervening private or public networks 512. Modems, cable modem and Ethernet cards are just a few of the currently available types of network adapters.

In any case, it should be understood that the components illustrated herein may be implemented in various forms of hardware, software, or combinations thereof, e.g., application specific integrated circuit(s) (ASIC), functional circuitry, one or more appropriately programmed general purpose digital computers with associated memory, and the like. Given the teachings of the invention provided herein, one of ordinary skill in the related art will be able to contemplate other implementations of the components of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for generating at least one output expression from at least one input expression, the method comprising the step of applying at least one transformation to at least one sub-expression of the at least one input expression to produce the at least one output expression,
   wherein the at least one input expression is a logical expression of a first policy and the at least one output expression is at least one logical expression of a second policy,
   wherein said transformation compares a sub-expression in a representation of said first policy with a sub-expression in a representation of a rule, wherein said at least one output expression is another sub-expression of said rule if said compared sub-expressions are substantially equivalent,
   wherein the step of applying at least one transformation to at least one sub-expression of the at least one input expression to produce the at least one output expression comprises the step of replacing at least one input sub-expression with at least one output sub-expression,
   wherein the at least one input sub-expression is at least one element of at least one set of input sub-expressions, and the at least one output sub-expression is at least one element of at least one set of output sub-expressions,
   wherein the step of replacing the at least one input sub-expression with the at least one output sub-expression comprises comparing the at least one sub-expression of the input expression to each element of the at least one set of input sub-expressions, finding a match between the at least one sub-expression of the input expression and at least one element of the at least one set of input sub-expressions, and substituting the at least one sub-expression of the input expression that matches the at least one element of the at least one set of input sub-expressions with at least one output sub-expression of the at least one set of output sub-expressions that corresponds to the at least one element of the at least one set of input sub-expressions, and
wherein one or more steps of said method are performed by one or more hardware devices.

2. The method of claim 1 wherein the at least one input expression and the at least one output expression are syntactically distinct but semantically equivalent.

3. The method of claim 1 wherein the at least one input expression is at least one logical expression of at least one high-level policy and the at least one output expression is at least one logical expression of at least one low-level policy.

4. The method of claim 1 wherein the at least one input expression is at least one logical expression of at least one low-level policy and the at least one output expression is at least one logical expression of at least one high-level policy.

5. The method of claim 1 wherein the at least one output sub-expression corresponds to the at least one input sub-expression.

6. The method of claim 5 wherein the at least one input sub-expression is a key of at least one associative array, the key having at least one corresponding value which is the at least one output sub-expression that corresponds to the at least one input sub-expression.

7. The method of claim 1 where the step of comparing the at least one sub-expression of the input expression to the at least one element of the at least one set of input sub-expressions comprises the steps of:
performing at least one traversal of both the at least one sub-expression of the input expression and at least one element of the at least one set of input sub-expressions, the traversal involving the visitation of at least one node;
forming at least one representation of the at least one node visited on the at least one traversal; and
comparing the at least one representation of the at least one sub-expression of the input expression to at least one representation of the at least one element of the set of input sub-expressions.

8. The method of claim 7 wherein a representation is at least one string representation.

9. The method of claim 8 wherein the at least one string representation comprises contents of the at least one node visited on the at least one traversal.

10. The method of claim 7 wherein the at least one traversal is at least one pre-order traversal.

11. The method of claim 7 wherein the at least one traversal is at least one in-order traversal.

12. The method of claim 7 wherein the at least one traversal is at least one post-order traversal.

13. The method of claim 1 further comprising the step of reducing the at least one input expression to a canonical form.

14. The method of claim 13 wherein the canonical form is a conjunctive normal form.

15. The method of claim 13 wherein the canonical form is a disjunctive normal form.

16. The method of claim 1 further comprising the steps of:
traversing at least one parent node of at least one input sub-expression;
comparing children nodes of the at least one parent node; and
swapping the children nodes of the at least one parent node to ensure they are in order.

17. The method of claim 1 where the logical expressions are trees.

18. The method of claim 1 where a sub-expression is a sub-tree.

19. An apparatus for generating at least one output expression from at least one input expression, the apparatus comprising:
a memory; and
at least one processor coupled to the memory and operative to apply at least one transformation to at least one sub-expression of the at least one input expression to produce the at least one output expression,
wherein the at least one input expression is a logical expression of a first policy and the at least one output expression is at least one logical expression of a second policy,
wherein said transformation compares a sub-expression in a representation of said first policy with a sub-expression in a representation of a rule,
wherein said at least one output expression is another sub-expression of said rule if said compared sub-expressions are substantially equivalent,
wherein the step of applying at least one transformation to at least one sub-expression of the at least one input expression to produce the at least one output expression comprises the step of replacing at least one input sub-expression with at least one output sub-expression,
wherein the at least one input sub-expression is at least one element of at least one set of input sub-expressions, and the at least one output sub-expression is at least one element of at least one set of output sub-expressions, and
wherein the step of replacing the at least one input sub-expression with the at least one output sub-expression comprises comparing the at least one sub-expression of the input expression to each element of the at least one set of input sub-expressions, finding a match between the at least one sub-expression of the input expression and at least one element of the at least one set of input sub-expressions, and substituting the at least one sub-expression of the input expression that matches the at least one element of the at least one set of input sub-expressions with at least one output sub-expression of the at least one set of output sub-expressions that corresponds to the at least one element of the at least one set of input sub-expressions.

20. An article of manufacture for generating at least one output expression from at least one input expression, comprising a tangible machine readable recordable storage device containing one or more programs which when executed implement the step of applying at least one transformation to at least one sub-expression of the at least one input expression to produce the at least one output expression,
wherein the at least one input expression is a logical expression of a first policy and the at least one output expression is at least one logical expression of a second policy,
wherein said transformation compares a sub-expression in a representation of said first policy with a sub-expression in a representation of a rule,
wherein said at least one output expression is another sub-expression of said rule if said compared sub-expressions are substantially equivalent,
wherein the step of applying at least one transformation to at least one sub-expression of the at least one input expression to produce the at least one output expression comprises the step of replacing at least one input sub-expression with at least one output sub-expression,
wherein the at least one input sub-expression is at least one element of at least one set of input sub-expressions, and the at least one output sub-expression is at least one element of at least one set of output sub-expressions, and wherein the step of replacing the at least one input sub-expression with the at least one output sub-expression comprises comparing the at least one sub-expression of the input expression to each element of the at least one set of input sub-expressions, finding a match between the at least one sub-expression of the input expression and at least one element of the at least one set of input sub-expressions, and substituting the at least one sub-expression of the input expression that matches the at least one element of the at least one set of input sub-expressions with at least one output sub-expression of the at least one set of output sub-expressions that corresponds to the at least one element of the at least one set of input sub-expressions.

* * * * *